Patented July 13, 1937

2,087,006

UNITED STATES PATENT OFFICE 2,087,006

PROCESS FOR EVAPORATING MAGNESIUM HYDROXIDE AND THE PRODUCTS THEREOF

Lloyd K. Riggs, Newark, N. J., assignor, by mesne assignments, to The Charles H. Phillips Chemical Co., Glenbrook, Conn., a corporation of Connecticut No Drawing. Application December 6, 1929, Serial No. 412,294

9 Claims. (Cl. 252—6)

This invention relates to a process for treating the suspension of magnesium hydroxide or magma magnesia, or what is popularly known as "milk of magnesia" in such a way as to remove the moisture therefrom and produce a dried product which can thereafter be restored to substantially its original form by the mere addition of water. The process relates, further, to the treatment of this magnesia compound with a substance which serves as a protector and enables the removal of the liquid to take place by evaporation without injury to the essential character of the said magnesia compound. The invention includes also, as a new product, the dried magnesia compound resulting from said process and capable of restoration to substantially the form of the liquid magnesium hydroxide by the mere addition of water.

Magnesium hydroxide is commonly sold and used in a liquid or suspended form, particularly under the name of "milk of magnesia", for medicinal use and is taken internally as a laxative and antacid preparation and for other purposes where a harmless alkaline substance is desired. The liquid form in which this preparation is commonly sold and stored is necessarily inconvenient and uneconomical by reason of its bulk and liquid character. Attempts have been made to overcome this defect by evaporating such magnesia preparations to dryness in order to produce a powder or tablets which could be more readily carried and stored. Such efforts have been unsuccessful for the reason that, in drying the magnesia preparation its colloidal-like character disappears and the composition changes to a substantially insoluble form. When this dried preparation is mixed with water there is no restoration of the original magnesium hydroxide, but instead there is a watery liquid in which appear unsuspended and undissolved lumps of magnesium hydroxide and magnesium carbonate. This substance lacks some of the beneficial qualities of magnesium hydroxide and its form constitutes a danger to human health if the substance be taken internally.

It is an object of the present invention to obtain the desired dryness in magnesium hydroxide without injury to the colloidal-like and other desired qualities of the product.

It is a further object to produce, as a new product, a dried form of magnesium hydroxide which is capable of restoration to substantially the form of the original magnesium hydroxide suspension upon the addition of water. It is also an object to make such restored product innocuous and beneficial for internal use as a medicine and palatable to the user. Other objects will be in part obvious and will in part appear hereinafter.

In practicing this invention a suspension of magnesium hydroxide is mixed with a protective agent which tends to preserve, in finely divided condition, the magnesium hydroxide particles so that the preparation will retain its colloidal-like character. Such a protector must necessarily be innocuous when taken internally and should be attractive to the taste of the user, as well as performing its primary protective function. Cane sugar meets all these requirements and is preferably mixed with the suspension of magnesium hydroxide in the proportion, by weight, of about 70 parts of cane sugar to 30 parts of magnesium hydroxide content. The quantity of sugar used may be reduced slightly or increased to any extent desired. After these two substances are mixed the compound is evaporated, the evaporation preferably being carried out with stirring and under vacuum, but may also be performed with less efficiency at ordinary pressure. Evaporation is carried on until the product reaches substantial dryness so that it can be readily ground and powdered. Thereafter it may be stamped into tablets or put into capsules.

When it is desired to use this product it is necessary only to add water and a reversal takes place in which substantially the original suspension of magnesium hydroxide, with its sugar content, is regained, the colloidal-like character being well preserved. The protector used serves not only to preserve these qualities during evaporation and while the product is in the dry state, but tends also to protect it from being affected by carbon dioxide.

Since certain changes in carrying out the above process may be made without departing from the scope of the invention, it is intended that all matter contained in the above description shall be interpreted as illustrative and not in a limiting sense.

It is also to be understood that the following claims are intended to cover all of the generic features and all statements of the scope of the invention which, as a matter of language, might be said to fall therebetween. In particular, wherever the term suspension of "magnesium hydroxide" is used, it is intended to include magma magnesia, or the form popularly known as milk of magnesia.

The sugar will serve also to protect the magnesium hydroxide against the ill effects which usually result from its freezing and a portion of the advantage of this invention can thus be obtained even without the step of evaporation.

Having described my invention, what I claim as new and desire to secure by Letters Patent is:—

1. The process of treating a suspension of magnesium hydroxide which includes mixing the same with cane sugar in the proportion by weight of substantially 30% magnesium hydroxide and 70% sugar, and thereafter evaporating the same to substantial dryness.

2. The process comprising evaporating a suspension of magnesium hydroxide to substantial dryness in the presence of sufficient sugar to protect the magnesium hydroxide and enable the dried product to be restored to substantially its unevaporated form upon the addition of water.

3. A new product of manufacture consisting substantially of an evaporated mixture of milk of magnesia and sugar.

4. A new product of manufacture comprising dry magnesium hydroxide and sugar, so combined as to be adapted, upon the addition of water, to produce a suspension of magnesium hydroxide in a finely divided condition characteristic of milk of magnesia.

5. The process of producing desiccated milk of magnesia which comprises adding sugar to the liquid milk of magnesia and evaporating the mixture to substantial dryness.

6. A new product of manufacture comprising substantially an evaporated mixture of sugar with magnesium hydroxide in particles capable of colloidal-like suspension upon mixture with water.

7. A new product of manufacture comprising dry magnesium hydroxide having substantially colloidal-like particles and sugar.

8. The process comprising evaporating a suspension of magnesium hydroxide to substantial dryness in vacuum and in the presence of sufficient sugar to protect the magnesium hydroxide and enable the dried product to be restored to substantially its unevaporated form upon the addition of water.

9. A new product of manufacture comprising dry magnesium hydroxide in particles substantially of colloidal-like size, and sugar separating said particles.

LLOYD K. RIGGS.